(12) United States Patent
Szmuk et al.

(10) Patent No.: US 12,314,815 B2
(45) Date of Patent: May 27, 2025

(54) AUTO-CALIBRATING MIXERS IN A QUANTUM ORCHESTRATION PLATFORM

(71) Applicant: Quantum Machines, Tel Aviv (IL)

(72) Inventors: Ramon Szmuk, Talence (FR); Yonatan Cohen, Tel Aviv (IL); Nissim Ofek, Tel Aviv (IL); Itamar Sivan, Tel Aviv (IL)

(73) Assignee: Q.M Technologies Ltd. (IL)

( * ) Notice: Subject to any disclaimer, the term of this patent is extended or adjusted under 35 U.S.C. 154(b) by 634 days.

(21) Appl. No.: 17/682,130

(22) Filed: Feb. 28, 2022

(65) Prior Publication Data

US 2023/0274173 A1    Aug. 31, 2023

(51) Int. Cl.
*G06N 10/40*    (2022.01)

(52) U.S. Cl.
CPC .................... *G06N 10/40* (2022.01)

(58) Field of Classification Search
CPC ...................................... G06N 10/40
USPC ........................................... 716/100
See application file for complete search history.

(56) References Cited

U.S. PATENT DOCUMENTS

| | | | |
|---|---|---|---|
| 4,875,484 A | 10/1989 | Anzai et al. | |
| 6,426,984 B1 | 7/2002 | Perino et al. | |
| 6,993,108 B1 | 1/2006 | Chi et al. | |
| 7,451,292 B2 | 11/2008 | Routt | |
| 7,535,931 B1 | 5/2009 | Zampetti et al. | |
| 7,627,126 B1 | 12/2009 | Pikalo | |
| 8,315,969 B2 | 11/2012 | Roetteler | |
| 8,385,878 B2 | 2/2013 | Rao | |
| 8,401,600 B1* | 3/2013 | Filippov | H10N 60/12 505/190 |
| 8,750,717 B1 | 6/2014 | Yap et al. | |

(Continued)

FOREIGN PATENT DOCUMENTS

| | | |
|---|---|---|
| CA | 2420022 A1 | 2/2003 |
| CN | 104467843 A | 3/2015 |

(Continued)

OTHER PUBLICATIONS

U.S. Appl. No. 62/294,966, filed Feb. 12, 2016.

(Continued)

*Primary Examiner* — Jack Chiang
*Assistant Examiner* — Suchin Parihar
(74) *Attorney, Agent, or Firm* — McAndrews, Held & Malloy, Ltd.

(57) ABSTRACT

This disclosure describes an auto-calibration of mixers in a quantum orchestration platform. Predistortion is computed according to an RF signal that is downconverted with a local oscillator tone that is offset from an upconverter tone. Three tones present in the original RF signal are distinguished and used to construct a cost function. The minimization of the cost function is used to cancel an unwanted LO leakage and an image tone. Because the quantum orchestration platform generates both the unconverted IQ signals and the cost function for their optimization, the optimization can be performed in real time inside a single device without the need to communicate with external devices. This allows for the optimization of single sideband upconverted signals in a fraction of the time it typically takes using distributed systems employing separate waveform generators and spectrum analyzers.

16 Claims, 4 Drawing Sheets

(56) References Cited

U.S. PATENT DOCUMENTS

| | | |
|---|---|---|
| 9,207,672 B2 | 12/2015 | Williams |
| 9,400,499 B2 | 7/2016 | Williams |
| 9,509,324 B2 | 11/2016 | McDonald et al. |
| 9,692,423 B2 | 6/2017 | McDermott, III |
| 9,847,121 B2 | 12/2017 | Frank |
| 9,858,531 B1 | 1/2018 | Monroe |
| 9,892,365 B2 | 2/2018 | Rigetti |
| 9,978,020 B1 | 5/2018 | Gambetta |
| 9,979,400 B1 | 5/2018 | Sete |
| 9,996,801 B2 | 6/2018 | Shim |
| 10,063,228 B2 | 8/2018 | Deurloo et al. |
| 10,122,351 B1 | 11/2018 | Naaman |
| 10,127,499 B1 | 11/2018 | Rigetti |
| 10,192,168 B2 | 1/2019 | Rigetti |
| 10,223,643 B1 | 3/2019 | Bishop et al. |
| 10,333,503 B1 | 6/2019 | Cohen et al. |
| 10,454,459 B1 | 10/2019 | Cohen |
| 10,496,069 B2 | 12/2019 | Nazarathy et al. |
| 10,505,524 B1 | 12/2019 | Cohen |
| 10,560,076 B1 | 2/2020 | Cohen |
| 10,637,449 B1 | 4/2020 | Cohen et al. |
| 10,659,018 B1 | 5/2020 | Cohen |
| 10,666,238 B1 | 5/2020 | Cohen |
| 10,958,253 B1 | 3/2021 | Cohen et al. |
| 10,985,739 B2 | 4/2021 | Cohen et al. |
| 11,010,145 B1 | 5/2021 | Smith et al. |
| 11,463,075 B2 | 10/2022 | Cohen et al. |
| 2004/0266084 A1 | 12/2004 | Fujishima et al. |
| 2005/0180575 A1 | 8/2005 | Maeda et al. |
| 2006/0093376 A1 | 5/2006 | Mitchell et al. |
| 2008/0037693 A1 | 2/2008 | Andrus et al. |
| 2011/0035511 A1 | 2/2011 | Biederman |
| 2016/0125311 A1 | 5/2016 | Fuechsle et al. |
| 2016/0267032 A1 | 9/2016 | Rigetti et al. |
| 2016/0292586 A1 | 10/2016 | Rigetti et al. |
| 2017/0094618 A1 | 3/2017 | Bjorkengren |
| 2017/0214410 A1 | 7/2017 | Hincks et al. |
| 2017/0364796 A1 | 12/2017 | Wiebe |
| 2018/0013426 A1 | 1/2018 | Deurloo et al. |
| 2018/0032893 A1 | 2/2018 | Epstein |
| 2018/0091244 A1 | 3/2018 | Abdo |
| 2018/0107579 A1 | 4/2018 | Chapman |
| 2018/0123597 A1 | 5/2018 | Sete |
| 2018/0237039 A1 | 8/2018 | Mong et al. |
| 2018/0260245 A1 | 9/2018 | Smith |
| 2018/0260730 A1 | 9/2018 | Reagor |
| 2018/0260732 A1 | 9/2018 | Bloom |
| 2018/0308007 A1 | 10/2018 | Amin |
| 2018/0322409 A1 | 11/2018 | Barends |
| 2018/0365585 A1 | 12/2018 | Smith |
| 2018/0373995 A1 | 12/2018 | Tomaru et al. |
| 2018/0375650 A1 | 12/2018 | Legre |
| 2019/0042964 A1 | 2/2019 | Elsherbini et al. |
| 2019/0042965 A1 | 2/2019 | Clarke |
| 2019/0042970 A1 | 2/2019 | Zou |
| 2019/0042971 A1 | 2/2019 | Zou |
| 2019/0042972 A1 | 2/2019 | Zou |
| 2019/0042973 A1 | 2/2019 | Zou |
| 2019/0049495 A1 | 2/2019 | Ofek |
| 2019/0251478 A1 | 8/2019 | Bishop et al. |
| 2019/0266512 A1 | 8/2019 | Shen et al. |
| 2019/0302832 A1 | 10/2019 | Morgan et al. |
| 2019/0385088 A1 | 12/2019 | Naaman et al. |
| 2020/0293080 A1 | 9/2020 | Poon et al. |
| 2020/0364602 A1 | 11/2020 | Niu et al. |
| 2021/0004707 A1 | 1/2021 | Gambetta et al. |
| 2021/0103847 A1 | 4/2021 | Akzam |
| 2021/0125096 A1 | 4/2021 | Puri et al. |
| 2022/0045666 A1* | 2/2022 | Szmuk ............... G06N 10/00 |
| 2022/0329237 A1* | 10/2022 | Sivan .................. H03K 5/19 |
| 2022/0407460 A1* | 12/2022 | Chakraborty ........ H03D 7/1441 |
| 2023/0054999 A1* | 2/2023 | Chakraborty ......... H03M 1/662 |
| 2024/0022248 A1* | 1/2024 | Pellerano ................ H03F 3/21 |
| 2024/0135224 A1* | 4/2024 | Wang ................ G06N 10/40 |

FOREIGN PATENT DOCUMENTS

| | | |
|---|---|---|
| CN | 105281886 A | 1/2016 |
| CN | 105912070 A | 8/2016 |
| CN | 108111306 A | 6/2018 |
| CN | 110085094 A | 8/2019 |
| CN | 110677210 A | 1/2020 |
| CN | 111464154 A | 7/2020 |
| CN | 111767055 A | 10/2020 |
| CN | 112019193 A | 12/2020 |
| CN | 112149832 A | 12/2020 |
| JP | 2011175078 A | 9/2011 |
| WO | 2015178991 A2 | 11/2015 |
| WO | 2015178992 A2 | 11/2015 |
| WO | 2017078735 A1 | 5/2017 |
| WO | 2017139683 A1 | 8/2017 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |
| WO | 2021123903 A1 | 6/2021 |

OTHER PUBLICATIONS

Int'l Search Report and Written Opinion Appln No. PCT/IB2019/001410 mailed Jun. 10, 2020.

Int'l Search Report and Written Opinion Appln No. PCT/IB2019/001394 mailed Jun. 17, 2020.

Zhang J, Hegde SS, Suter D. Pulse sequences for controlled 2-and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

Int'l Search Report and Written Opinion Appln No. PCT/IB2020/000218 mailed Aug. 11, 2020.

Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 ( Jul. 25, 2016).

Int'l Search Report and Written Opinion Appln No. PCT/IB2020/000376 mailed Sep. 17, 2020.

Breitfelder et al. eds., IEEE 100: The Authoritative Dictionary of IEEE Standards Terms 1247, definition 2 of "variable" (7th ed. 2000). (Year: 2000).

Int'l Search Report and Written Opinion Appln No. PCT/IB2020/000707 mailed Jan. 12, 2021.

National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4 , pp. 30, 57.

IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.

Int'l Search Report and Written Opinion Appln No. PCT/IB2020/000704 mailed Jan. 17, 2021.

Wolfowicz, et al. Pulse Techniques for Quantum Information Processing University of Chicago, University College London, eMagRes, 2016, vol. 5: 1515-1528. DOI 10.1002/9780470034590.emrstm1521.

Int'l Search Report and Written Opinion Appln No. PCT/IB2020/000555 mailed Dec. 27, 2020.

Int'l Search Report and Written Opinion Appln No. PCT/IB2020/000760 mailed Jan. 27, 2021.

"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf> McDermott R. et al. Oct. 12, 2017 (Oct. 12, 2017) Section VI, VII, VIII.

(56) References Cited

OTHER PUBLICATIONS

Roffe, J., Quantum Error Correction: An Introductory Guide, Dept. of Physics & Astronomy, Univ. of Sheffeld, UK, Oct. 10, 2019, pp. 1-29.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.
Int'l Search Report and Written Opinion Appln No. PCT/IB2022/000059 mailed Jul. 7, 2022.
Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-87f7-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).
Int'l Search Report and Written Opinion Appln No. PCT/IB2022/000068 mailed Jul. 17, 2022.
D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).
Extended European Search Report Appln No. 19889443.8 dated Aug. 4, 2022.
Int'l Search Report and Written Opinion Appln No. PCT/IB2022/054903 mailed Sep. 8, 2022.
Int'l Preliminary Report on Patentability Appln No. PCT/IB2021/000067 mailed Sep. 22, 2022.
Int'l Search Report and Written Opinion Appln No. PCT/IB2022/053304 mailed Oct. 6, 2022.
Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.
Extended European Search Report Appln No. 19910800.2 dated Oct. 6, 2022.
Hornibrook J Met Al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.
Fu X et al: "An Experimental Microarchitecture for a Superconducting Quantum Processor", MICRO-50 '17: Proceedings of the 50th Annual IEEE/ACM International Symposium On Microarchitecture, Cornell University Library, 201 Olin Library Cornell University Ithaca, NY 14853, Oct. 14, 2017 (Oct. 14, 2017), pp. 1-13, XP081291220.
Zopes J. et al: "High resolution quantum sensing with shaped control pulses", arxiv.org, Cornell University Library, 201 Olin Library Cornell University Ithaca, NY 14853, May 22, 2017 (May 22, 2017), XP081276850.

* cited by examiner

AUTO-CALIBRATING MIXERS IN A QUANTUM ORCHESTRATION PLATFORM

BACKGROUND

Limitations and disadvantages of using frequency conversion mixers in a quantum computing system will become apparent to one of skill in the art, through comparison of such approaches with some aspects of the present method and system set forth in the remainder of this disclosure with reference to the drawings.

BRIEF SUMMARY

Systems and methods are provided for auto-calibrating mixers in a quantum orchestration platform, substantially as illustrated by and/or described in connection with at least one of the figures, as set forth more completely in the claims.

DETAILED DESCRIPTION

Figure 1:
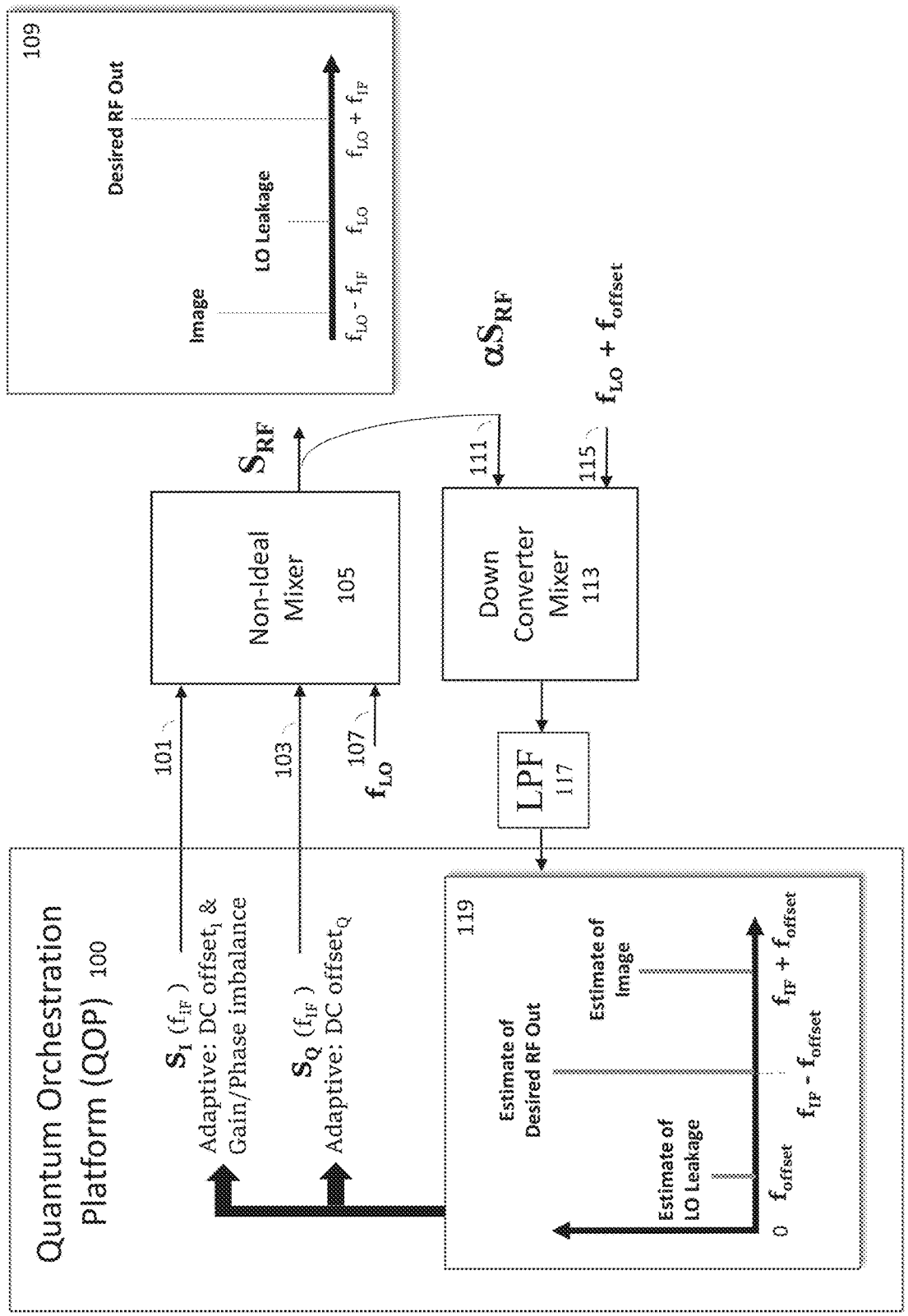
FIG. 1 illustrates a first example system for automatic mixer calibration in accordance with various example implementations of this disclosure.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 volt for a "1" or 0 volts for a "0"). The logic operation typically comprises of one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle+\beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. The basis states $|0\rangle$ and $|1\rangle$ can also be represented by two-dimensional basis vectors $$\begin{bmatrix}1\\0\end{bmatrix}$$

and $$\begin{bmatrix}0\\1\end{bmatrix},$$

respectively. The qubit state may be represented by $$\begin{bmatrix}\alpha\\\beta\end{bmatrix}.$$

The operations performed by the quantum gates are defined by linear algebra over a Hilbert space and the circuit behavior is governed by quantum physics. This extra richness in the mathematical behavior of qubits and the operations on them, enables quantum computers to solve some problems much faster than classical computers. In fact, some problems that are intractable for classical computers become trivial for quantum computers.

Unlike a classical bit, a qubit cannot be stored as a single voltage value. Instead, a qubit is physically realized using a two-level quantum mechanical system. For example, at time 0 a qubit is described as $$\begin{bmatrix}\alpha_1\\\beta_1\end{bmatrix},$$

at time 1 a logic operation is applied to the qubit, and at time 2 the qubit is described as $$\begin{bmatrix}\alpha_2\\\beta_2\end{bmatrix}.$$

Many physical implementations of qubits have been proposed and developed over the years. Some examples of qubits implementations include superconducting circuits, spin qubits, trapped ions, and neutral atom arrays. A quantum orchestration platform (QOP) may comprise a quantum controller (QC) and a quantum programming subsystem that sits above the quantum hardware as a quantum control stack.

It is the job of a QC to generate the precise series of external signals, usually pulses of electromagnetic waves and pulses of base band voltages, to perform the desired logic operations (and thus carry out the desired quantum algorithm).

The quantum programming subsystem comprises circuitry operable to generate a quantum algorithm description which configures the QC and includes instructions the QC can execute to carry out the quantum algorithm (i.e., generate the necessary outbound quantum control pulse(s)) with little or no human intervention during runtime. In an example implementation, the quantum programming system is a personal computer comprising a processor, memory, and other associated circuitry (e.g., an x86 or x64 chipset). The quantum programming subsystem then compiles the high-level quantum algorithm description to a machine code version of the quantum algorithm description (i.e., series of binary vectors that represent instructions that the QCs hardware can interpret and execute directly).

The quantum programming subsystem may be coupled to the QC via an interconnect which may, for example, utilize a universal serial bus (USB), a peripheral component interconnect (PCIe) bus, wired or wireless Ethernet, or any other suitable communication protocol.

The QC comprises circuitry operable to load the machine code quantum algorithm description from the programming subsystem via the interconnect. Then, execution of the machine code by the QC causes the QC to generate the necessary outbound quantum control pulse(s) that correspond to the desired operations to be performed on the quantum processor (e.g., sent to qubit(s) for manipulating a state of the qubit(s) or to readout resonator(s) for reading the state of the qubit(s), etc.). Depending on the quantum algorithm to be performed, outbound pulse(s) for carrying out the algorithm may be predetermined at design time and/or may need to be determined during runtime. The runtime determination of the pulses may comprise performance of classical calculations and processing in the QC during runtime of the algorithm (e.g., runtime analysis of inbound pulses received from the quantum processor).

During runtime and/or upon completion of a quantum algorithm performed by the QC, the QC may output data/results to the quantum programming subsystem. In an example implementation these results may be used to generate a new quantum algorithm description for a subsequent run of the quantum algorithm and/or update the quantum algorithm description during runtime.

A QC comprises a plurality of pulse processors, which may be implemented in a field programmable gate array, an application specific integrated circuit or the like. A pulse processor is operable to control outbound pulses that drive a quantum element (e.g., one or more qubits and/or resonators). A pulse processor is also operable to receive inbound pulses from a quantum element.

Each pulse processor may share data, metadata and computational values with one or more other pulse processors and make joint decisions regarding the control flow and the quantum data sent to the quantum elements. Pulse processors may, therefore, be operable synchronously. Because a QC only has a limited set of pulse processors, one QC may only be operable to control a quantum device with a limited number of quantum elements.

In some scenarios however, the quantum algorithm may require multiple pulse processors across a plurality of QCs to perform joint processing. A large number of parallel operations may be required across these multiple QCs.

As the size and complexity of quantum computers increases, the number of pulse processor must also increase. As a result, a quantum algorithm comprising of a large number of quantum elements may require multiple pulse processors across a plurality of QCs to perform joint processing.

The analog output stage of the QOP can contain a frequency translation circuit used to upconvert the baseband frequency signals generated by the quantum orchestration platform to higher frequencies, typically in the GHz regime for superconducting and spin qubits. For neutral atoms and ions, the carrier may be a laser, and, therefore, the baseband signal may be upconverted typically to hundreds of THz. In such a case, and acousto-optic modulator may be used instead of a mixer.

A second, downconversion stage is used to translate back high frequency signals into the baseband frequency where they can be treated by the QOP. Such up/down conversion stages usually employ mixers, either regular or IQ mixers for quadrature up/down conversion.

However, mixers are not ideal devices, in that the output RF signal from a conventional mixer will usually contain leakage tones of the LO carrier as well as unwanted image tones and intermodulation products which pollute the output spectrum with undesired spectral components. In order to suppress these unwanted tones the QOP may incorporates an automatic IQ mixer calibration system as illustrated in FIG. 1.

In FIG. 1, a QOP 100 provides an in-phase signal, $S_I$ 101, and a quadrature-phase signal, $S_Q$ 103, that are upconverted by a non-ideal mixer 105 using an oscillator signal, $f_{LO}$ 107. The in-phase signal, $S_I$ 101, may represented as $S_I$=a cos (2π $f_{IF}$ t), and the quadrature-phase signal, $S_Q$ 103, may represented as $S_Q$=a sin (2π $f_{IF}$ t), where "a" is an amplitude and "$f_{IF}$" is an intermediate frequency.

The non-ideal mixer 105 generates an RF signal, $S_{RF}$ 109, that may comprise an image signal and an LO leakage signal in addition to the desired RF output. The RF signal, $S_{RF}$ 109, may be tapped to provide a scaled RF signal, $\alpha S_{RF}$ 111. The scaled RF signal, $\alpha S_{RF}$ 111, is downconverted by mixer 113. The down-converted signal is low-pass filtered by an LPF 117. The low-pass filtered signal 119 is digitally sampled by the QOP 100 IF band.

The LO frequency 131 used by the downconverting mixer 129 may be offset from the upconversion $f_{LO}$ by a controllable detuning $f_{offset}$. For example, if the $f_{offset}$ is selected such that $f_{offset}=f_{IF}/4$, the image signal (5 $f_{IF}/4$), LO leakage signal ($f_{IF}/4$) and desired RF output (3 $f_{IF}/4$) may be uniformly spaced in frequency. The $f_{offset}$ may also be tuned to any other frequency.

The offset LO may be generated by locking a synthesizer to the original LO tone using an offset lock resulting in an oscillator at frequency LO+offset. This may reduce complexity as it only requires a voltage controlled oscillator and a low frequency synthesizer capable of generating the offset frequency, as well as a mixer, filters and passive components. In such a way the generation of this LO+offset tone is simplified and a high frequency full-fledged synthesizer reaching GHz frequencies is not required.

In the QOP, a spectrum analysis of the digitally sampled, low-pass filtered signal 119 is used to determine the signal imperfections created by the non-ideal mixer 105. These imperfections are iteratively reduced via predistortion by adapting the DC offsets in $S_I$ 101 and $S_Q$ 103 and by adapting gain and phase imbalance in $S_I$ 101 and/or $S_Q$ 103. The signals $S_I$ 101 and $S_Q$ 103 originating from the QOP 100 and entering mixer 105 may be represented as:

$$S_I = a_{IF}(1+a_{IF\_err}/2)\cos(2\pi f_{IF}t+\phi_{IF\_err}/2)+I_{offset}$$

$$S_Q = a_{IF}(1+a_{IF\_err}/2)\sin(2\pi f_{IF}t+\phi_{IF\_err}/2)+Q_{offset}$$

$I_{offset}$ and $Q_{offset}$ denote DC offsets. In general it may be preferred to balance the correction also between $S_I$ 101 and $S_Q$ 103. Alternatively, the amplitude imperfection ($a_{IF\_err}$) and the phase imperfection ($\phi_{IF\_err}$) may located entirely in either $S_I$ 101 or $S_Q$ 103 without any loss of generality.

Within up-mixer 105, the LO tone ($f_{LO}$ 107) may be split using a 90 degrees hybrid coupler, the LO ports of two (e.g., double balanced) mixers may be fed with the split LO tones, and the RF output of each of the two mixers is then combined to generate the final RF signal $S_{RF}$ 109. A direct leakage of the LO tone to the RF output results in the LO tone being directly visible in the RF port.

When the desired signal is at frequency $f_{LO}+f_{IF}$, the imperfect IF and LO signals generate an output RF signal containing tones at $f_{LO}$ and the unwanted sideband, $f_{LO}-f_{IF}$. When the desired signal is at frequency $f_{LO}-f_{IF}$, the imperfect IF and LO signals generate an output RF signal containing tones at $f_{LO}$ and the unwanted sideband, $f_{LO}+f_{IF}$. The tone at frequency $f_{LO}$ is typically referred to as the LO leakage which is composed from the sum of the leakage due to mixing of the LO tone with DC offsets from the IF ports and the direct coupling from the LO and RF ports. The tone at the unwanted sideband is typically referred as the image tone. Both of these tones are to be suppressed for optimal single sideband upconversion.

The LO leakage tone can be suppressed by adjusting the DC offsets of the $S_I$ and $S_Q$ signals, $I_{offset}$ and $Q_{offset}$.

The image tone can be suppressed by adjusting the relative amplitude and phase of the $S_I$ and $S_Q$ signals, $a_{IF\_err}$ and $\phi_{IF\_err}$.

In the quantum orchestration platform the $S_I$ and $S_Q$ signals are generated by the pulse processor. The LO leakage and image tones are, therefore, suppressed via digital predistortion of the IF signals. The four parameters ($I_{offset}$, $Q_{offset}$, $a_{IF\_err}$, $\phi_{IF\_err}$) are optimized by minimizing a cost function.

In the example illustrated in FIG. 1, the upper sideband is the desired single sideband signal and the lower sideband is taken as the unwanted image but the inverse case is also possible without loss of generality.

The image sideband and LO leakage may also be optimized for a particular amplitude. For example, a user may want to have these leakage tones set to desired levels other than 0.

Additionally, a complex IQ modulated waveform (where both the I and Q in IF are multi-spectral) may be generated such that the waveform comprises many tones resulting in a multi spectral RF signal. This multi-spectral signal may be then optimized to contain any desired amplitude for each of the tones in a similar fashion.

Another option is to use such tone amplitude setting to minimize particular tones at particular frequencies. For example, if a qubit is sensitive to a particular tone at a particular frequency and/or the particular tone at the particular frequency may cause the qubit to decohere, a user may want to ensure that that particular tone is not sent to the qubit. The method and system disclosed herein may assist in such frequency planning by iterating/optimizing the LO/IF frequencies until no tone is present in one of these "forbidden" frequencies.

A portion of the $S_{RF}$ 109 may be tapped off. This signal $\alpha S_{RF}$ 111 may be downconverted in down-mixer 113 using an offset LO tone ($f_{LO}+f_{offset}$). The value of $f_{offset}$ is chosen to be high enough so that a short acquisition period of several microseconds will include several periods of the offset frequency and thus allow for a precise and fast convergence. A too large value will cause the image tone frequency ($f_{IF}+f_{offset}$) to be outside the sampling bandwidth and will limit the range of IF frequencies over which the calibration can be implemented. A good value is 10 MHz which allows 100 periods in a 10 microsecond acquisition window and does not limit too much the IF frequency that can be calibrated. From the original LO, we obtain the demodulated signal that may be low pass filtered 117 to remove all high frequency tones (ignoring the phase terms which is irrelevant as error signal depends only on the amplitude of the demodulated signal):

$$a_{image}\cos(2\pi[f_{IF}+f_{offset}]t)+a_{LO}\cos(2\pi f_{offset}t)+a_{SSB}\cos(2\pi[f_{IF}-f_{offset}]t)$$

The filtered signal 119 comprises baseband signals and is within the analog bandwidth of an ADC acquisition system of the QOP 100. The filtered signal 119 may be acquired and subsequently digitally analyzed to extract values proportional to $a_{image}$, $a_{LO}$, and $a_{SSB}$.

By demodulating the RF signal with an LO offset from the original upconversion LO, the weight of all three tones present in the original RF signal may be distinguished. The values proportional to $a_{image}$, $a_{LO}$, and $a_{SSB}$ may be used to construct a cost function. The minimization of the cost function is used in the cancellation of the unwanted LO leakage and image tones.

Since the QOP 100 generates both the unconverted IQ signals and the cost function for their optimization (via the offset LO technique) the whole optimization can be performed in real time inside a single device without the need to communicate with external devices.

This allows for the optimization of single sideband upconverted signals in a fraction of the time it typically takes using distributed systems employing separate waveform generators and spectrum analyzers.

The DC offsets and the relative phase may also be added near the mixer and not inside the QOP. For example, a DC voltage (sent from a separate DAC) may be added via a bias-T injector, and a relative phase may be injected just before the mixer via a voltage controlled phase shifter. Adding the DC offsets close to the mixer may benefit from using a local voltage reference. Also, being close to the mixer will eliminate drifts of the voltage due to the longer path the DC signal needs to travel from the FPGA in the QOP to the mixer. The overhead to transfer the DC offset (and phase) values to the DACs which are near the mixer may be shorter than a sampling time (e.g., 10 us). This calibration procedure may be performed on a dedicated FPGA near the mixer to free the QOP from this task. Using local DACs to set the DC offsets and phase may also allow a higher resolution on the DC and phase, thereby providing a better correction.

Another use for sampling the RF waveform at IF with the QOP is for the post-correction of errors on the qubit. The record of the signal that was sent may be used in classical error correction and in the interpretation of the experimental data.

Figure 2:
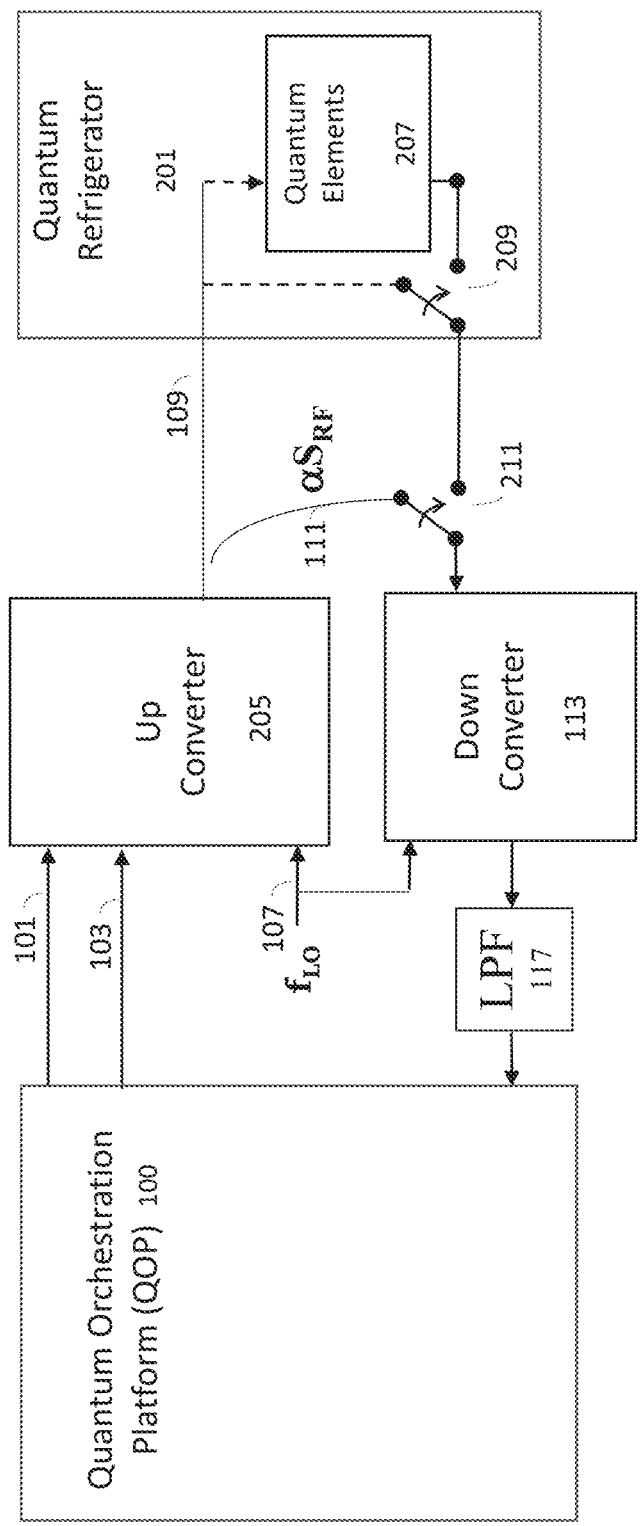
FIG. 2 illustrates a second example system for automatic mixer calibration in accordance with various example implementations of this disclosure.

FIG. 2 illustrates a second example system for automatic mixer calibration in accordance with various example implementations of this disclosure.

The system of FIG. 2 comprises a quantum refrigerator 201 configured to receive the RF signal from upconverter 205. Upconverter 205 comprises a mixer. For example, upconverter 205 may comprise the non-ideal mixer 105 (of FIG. 1). The quantum refrigerator 201 is used to cool quantum elements 207, such as qubits.

QOP 100 is configured to generate an I signal 101 and a Q signal 103 (with or without the adjustment described above with respect to FIG. 1) that are upconverted 205 to an RF. A portion of the RF signal 111 is switched 211 into the down converter 113, filtered 117 and received by the QOP.

While the portion of the RF signal 111 is being received by the QOP 100, the remainder of the RF signal 109 is sent to the quantum refrigerator 201. The RF signal 109 is received and returned to the down converter 113 via switches 209 and 211. The path to and from the quantum refrigerator 201 will typically introduce a delay. Each meter of cabling along the path may account for approximately 5 nsec of delay. With 10 m of cabling, for example, the portion of the RF signal 111 will reach switch 211 a full 50 nsec before the corresponding roundtrip signal from the quantum refrigerator 201. Accordingly, a pulsed RF signal of less than 50 nsec can be sampled, and then, switch 211 can be set to receive the refrigerator response without loss or overlap of signals. A signal analyzer in QOP 100 may be configured to determine a transfer function of the quantum refrigerator 201 according to a downconverted portion of the RF signal and a downconverted quantum refrigerator response, which follows on the same circuitry through switch 211, downconverter 113 and LPF 117.

Figure 3:
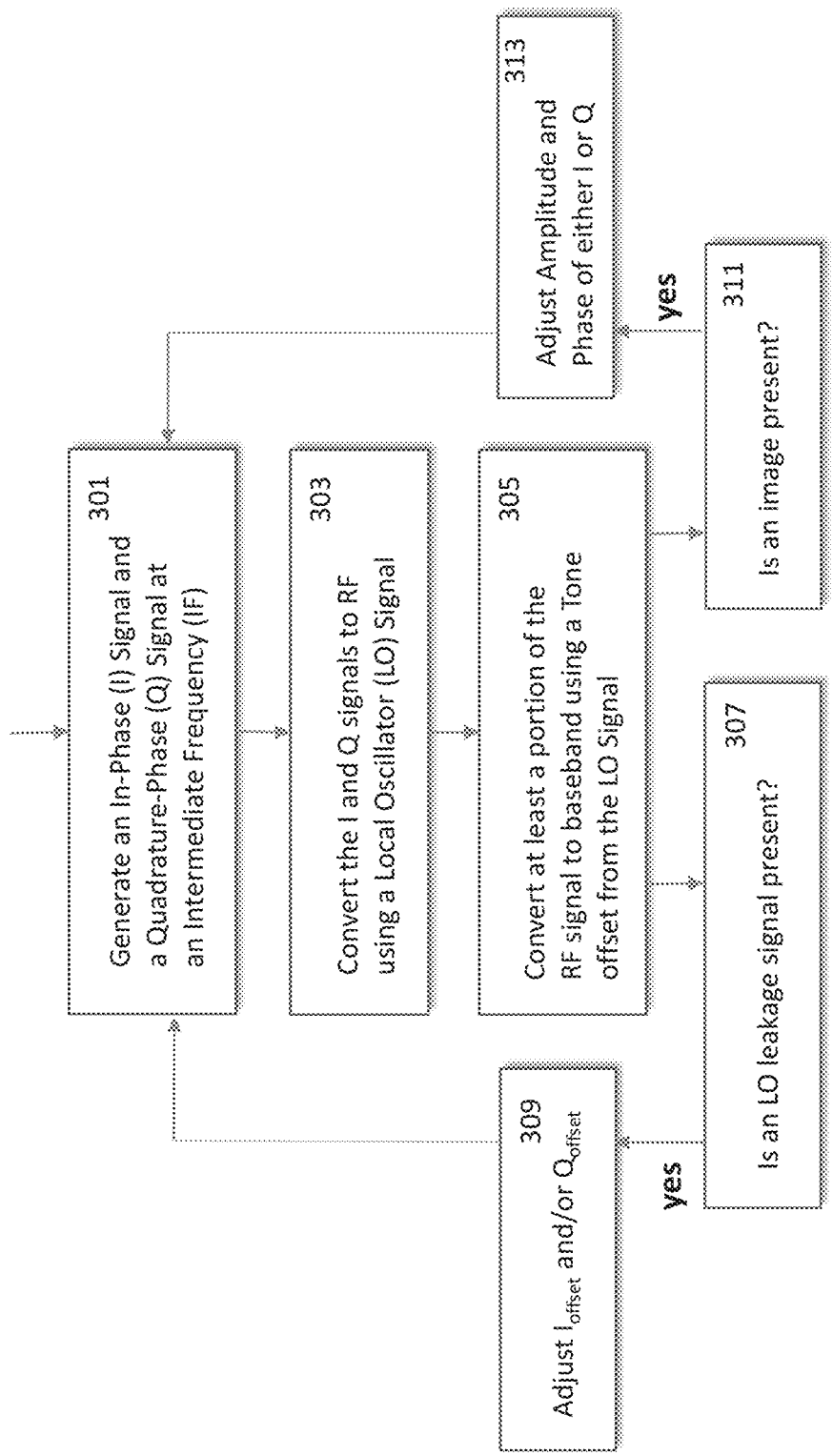
FIG. 3 illustrates a flowchart of a first example method for automatic mixer calibration in accordance with various example implementations of this disclosure.

FIG. 3 illustrates a flowchart of an example method for automatic mixer calibration.

At 301, an I signal and a Q signal are generated at an intermediate frequency (IF).

At 303, the I and Q signals are converted to RF using an LO signal.

At 305, at least a portion of the RF signal is converted to baseband using a tone that is offset from the LO signal.

At 307, the baseband signal is analyzed to determine whether an LO leakage signal may be present at the corresponding RF output. If an LO leakage signal is determined to be present, a DC offset adjustment is made to the I and Q signals, at 309, according to an LO leakage estimate and a history of LO leakage estimates.

At 311, the baseband signal is analyzed to determine whether an image signal may be present at the corresponding RF output. If an image signal is determined to be present, an amplitude and/or phase adjustment is made to either the I signal or the Q signal or both, at 313, according to an image estimate and a history of image estimates.

In the end, when the system is close to being optimized the DC offsets (in charge of optimizing the LO leakage) also affect the amplitude and phase parameters (in charge of the image), and so to reach optimal calibration, the last steps of optimization may consider all four parameters at the same time. Since the cost function for both the LO and image can be acquired in one shot (by digitally demodulating in parallel both the LO and image leakages) the optimizer may optimize a two-value cost function by iterating over all four parameters simultaneously.

Figure 4:
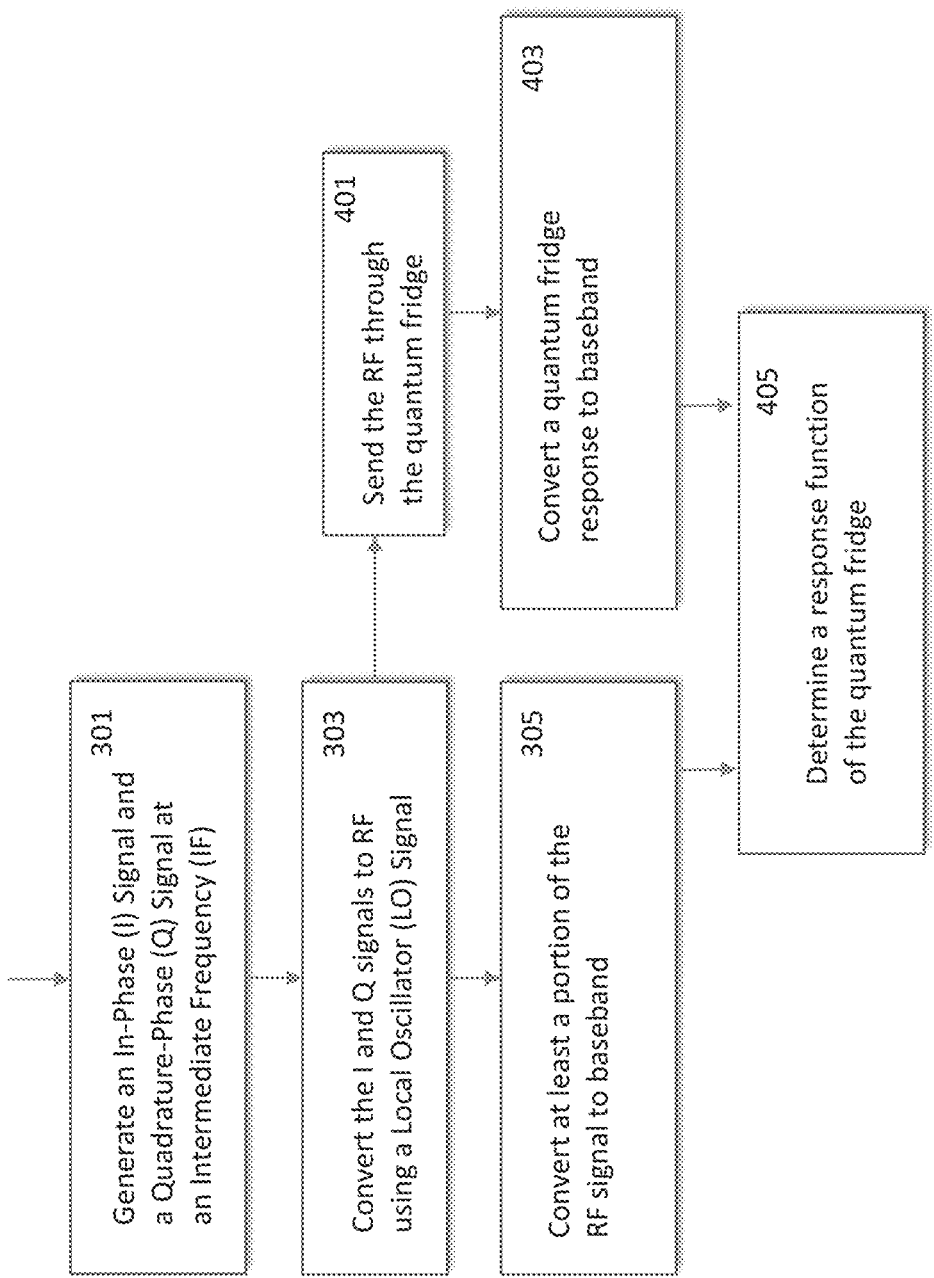
FIG. 4 illustrates a flowchart of a second example method for automatic mixer calibration in accordance with various example implementations of this disclosure.

FIG. 4 illustrates a flowchart of a second example method for automatic mixer calibration in accordance with various example implementations of this disclosure.

At 301, an I signal and a Q signal are generated at an intermediate frequency (IF).

At 303, the I and Q signals are converted to an RF signal using an LO signal.

At 401, the RF signal is sent to the quantum fridge.

At 305, at least a portion of the RF signal is converted to baseband. The downconverter may use the LO signal or a tone that is offset from the LO signal.

At 403, the quantum fridge response is converted to baseband. Because the RF signal travels a longer path to and from the quantum fridge, the quantum fridge response arrives at the downconverter after the portion of the RF signal is already converted to baseband.

At 405, a response function of the quantum fridge is determined according to the baseband signal (corresponding to the portion of the RF signal before the quantum fridge) and the modified baseband signal (corresponding to the RF signal after the quantum fridge).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system, the system comprising:
   a signal generator configured to generate an in-phase (I) signal and a quadrature-phase (Q) signal, wherein the I signal and the Q signal are at an intermediate frequency (IF);
   a first mixer configured to mix the I signal and the Q signal with a local oscillator (LO) signal to produce a radio frequency (RF) signal, wherein the RF signal is sent to a quantum element;
   a second mixer configured to mix a portion of the RF signal with a tone offset from the LO signal to produce a baseband signal; and
   a signal analyzer configured to determine an adjustment to one or both of the I signal and the Q signal according to the baseband signal, wherein:
   the adjustment modifies the RF signal sent to the quantum element,
   the system comprises a quantum refrigerator configured to receive the RF signal and operable to generate a refrigerator response, and
   the second mixer is operable to switch between downconverting the portion of the RF signal and downconverting the quantum refrigerator response.

2. The system of claim 1, wherein a quantum orchestration platform comprises the signal generator and the signal analyzer.

3. The system of claim 1, wherein a quantum orchestration platform comprises the first mixer and the second mixer.

4. The system of claim 1, wherein the signal analyzer is operable to determine a DC offset adjustment according to an LO leakage estimate and a history of LO leakage estimates.

5. The system of claim 4, wherein the DC offset is applied, via the signal generator, to one or both of the I signal and the Q signal.

6. The system of claim 1, wherein the signal analyzer is operable to determine a gain adjustment and a phase adjustment according to an image estimate and a history of image estimates.

7. The system of claim 6, wherein the gain adjustment and the phase adjustment are applied, via the signal generator, to one or both of the I signal and the Q signal.

8. The system of claim 1, wherein signal analyzer is configured to determine a transfer function of the quantum refrigerator according to a downconverted portion of the RF signal and a downconverted quantum refrigerator response.

9. A method, the method comprising:
   generating an in-phase (I) signal and a quadrature-phase (Q) signal, wherein the I signal and the Q signal are at an intermediate frequency (IF);
   mixing, via a first mixer, the I signal and the Q signal with a local oscillator (LO) signal to produce a radio frequency (RF) signal;
   sending the RF signal to a quantum element;
   mixing, via a second mixer, a portion of the RF signal with a tone offset from the LO signal to produce a baseband signal;
   determining an adjustment to one or both of the I signal and the Q signal according to the baseband signal;
   sending the RF signal to a quantum refrigerator;
   generating a refrigerator response; and
   mixing the refrigerator response, via the second mixer, to produce a modified baseband signal.

10. The method of claim 9, wherein a quantum orchestration platform is operable to generate the I signal and the Q signal.

11. The method of claim 9, wherein a quantum orchestration platform comprises the first mixer and the second mixer.

12. The method of claim 9, wherein determining an adjustment comprises determining a DC offset adjustment according to an LO leakage estimate and a history of LO leakage estimates.

13. The method of claim 12, wherein generating the I signal and the Q signal comprises adding the DC offset to one or both of the I signal and the Q signal.

14. The method of claim 9, wherein determining an adjustment comprises determining a gain adjustment and a phase adjustment according to an image estimate and a history of image estimates.

15. The method of claim 14, wherein generating the I signal and the Q signal comprises applying the gain adjustment and the phase adjustment to one or both of the I signal and the Q signal.

16. The method of claim 9, wherein the method comprises:
   determining a transfer function of the quantum refrigerator according to the baseband signal and the modified baseband signal.

* * * * *